United States Patent [19]

Ueki

[11] Patent Number: 5,280,866
[45] Date of Patent: Jan. 25, 1994

[54] FASTENER FOR ELONGATED BODIES

[75] Inventor: Yasushi Ueki, Yokohama, Japan

[73] Assignee: Nifco, Inc., Yokohama, Japan

[21] Appl. No.: 981,726

[22] Filed: Nov. 25, 1992

[30] Foreign Application Priority Data

Nov. 25, 1991 [JP] Japan .............................. 3-111353[U]

[51] Int. Cl.[5] ............................................. F16L 3/08
[52] U.S. Cl. .................................................. 248/74.2
[58] Field of Search .................... 248/74.3, 74.2, 74.1, 248/73, 72, 71; 24/546, 628

[56] References Cited

U.S. PATENT DOCUMENTS

| | | | |
|---|---|---|---|
| 3,913,187 | 10/1975 | Okuda | 248/74.3 X |
| 4,220,301 | 9/1980 | Jacobs et al. | 248/74.3 |
| 4,325,526 | 4/1982 | Kitagawa | 248/73 |
| 4,356,599 | 11/1982 | Larson et al. | 248/74.3 X |
| 4,478,381 | 10/1984 | Pittion et al. | 248/74.1 X |
| 4,564,163 | 1/1986 | Barnett | 248/74.3 X |
| 4,623,102 | 11/1986 | Hough et al. | 248/74.3 X |
| 4,669,156 | 6/1987 | Guido et al. | 248/74.3 X |
| 4,669,688 | 6/1987 | Itoh et al. | 248/74.3 X |
| 4,802,656 | 2/1989 | Cattani | 248/74.2 X |

Primary Examiner—Ramon O. Ramirez
Attorney, Agent, or Firm—Schwartz & Weinrieb

[57] ABSTRACT

A fastener for elongated bodies includes a base member, a press-and-clamp member, a stopper member and an engaging member. The press-and-clamp member has appropriate rigidity and is swingably connected to one end of the base member by means of a hinge so that the inner surface of the press-and-clamp member is capable of abutting the upper surface of the base member. The stopper member rises arcuately from the other end of the base member and has outer surface claws. The engaging member has a substantially U-shaped sectional profile, is integral with the press-and-clamp member, defines a space for admitting the stopper member and has inner surface claws releasably engageable with the outer surface claws of the stopper member when the stopper member is admitted in the space. Elongated bodies are clamped between the inner surface of the press-and-clamp member and the upper surface of the base member.

20 Claims, 4 Drawing Sheets

FASTENER FOR ELONGATED BODIES

BACKGROUND OF THE INVENTION

1. Field of the Invention

The present invention relates to a fastener for fastening elongated bodies such as electric cords and tubes along the surface of a panel.

2. Description of the Prior Art

Numerous electric cords are disposed inside an automobile or electric appliance. For protecting such cords, they are required to be bound together and the resulting bundle of cords to be fastened at a prescribed position. A variety of fasteners for binding cords together have heretofore been proposed and a number of such fasteners have been put into practice. However, existing fasteners of the type for fastening cords directly onto the metal panels of an automobile body or electric appliance are still not satisfactory to users. This type of fastener is fundamentally required to be fixed to a metal panel, to fasten cords to the panel so that they do not move in their longitudinal direction, to enable the cords to be unfastened with ease for maintenance inspection or replacement, and to enable the cords to be restrained again with ease.

As shown in FIG. 7, at the job site, a metal panel 101 is generally press formed to have a raised portion 102 of a trapezoidal sectional profile, and a plurality of electric cords 104 are placed in parallel on a flat portion 103 of the raised portion 102 and pressed against the flat portion 103 with an adhesive tape 105. The cords 104 are unfastened by peeling off the adhesive tape 105 and fastened again with another adhesive tape 105. Since the cords 104 cannot move in their longitudinal direction owing to the adhesive tape 105, the cord-fastening purpose is attained. However, the adhesive tape per se is not reliable and, since its adhesion is lower after it has once been peeled off, it is necessary to use a fresh piece of adhesive tape in order to again secure the cords 104. Further, since the cords 104 are directly laid along the raised portion 102, there is a possibility of the cladding of the cords 104 being damaged by burrs which may be formed on the periphery of the raised portion 102 in consequence of the press forming.

In view of the drawbacks encountered by the fastening means comprising an adhesive tape, a plastic fastener capable of repeating cord fastening and unfastening operations has been proposed in Japanese Utility Model Public Disclosure No. 64-9413. This prior art plastic fastener comprises a substrate, a holding member provided on the substrate for binding a prescribed number of electric cords together, and an engaging member with which the free end of the holding member is detachably engaged, whereby the cords can be detachably clamped. Therefore, the prior art plastic fastener can firmly fasten cords and is more reliable than the aforementioned fastening means comprising an adhesive tape. With the prior art plastic fastener, however, if the number of cords is less than the aforementioned prescribed number, it is impossible to restrain the cords against movement in their longitudinal direction, thus raising the problem of low fastening stability.

OBJECTS OF THE INVENTION

One object of the present invention is to eliminate the foregoing drawbacks and provide a fastener capable of detachably fastening elongated bodies such as electric cords along the surface of a metal panel of an automobile or electric appliance with high stability.

Another object of the present invention is to provide a fastener whose ability to firmly clamp and restrain a plurality of elongated bodies is not affected by changes in the number of the elongated bodies over a fairly wide range.

Still another object of the present invention is to provide an elongated body fastener which can be firmly fixed to a metal panel by a simple operation of pushing it against the surface of the metal panel.

SUMMARY OF THE INVENTION

To attain the objects described above, according to the present invention there is provided a fastener for elongated bodies which comprises a base member, a press-and-clamp member having appropriate rigidity and swingably connected to one end of the base member by means of a hinge so that an inner surface of the press-and-clamp member is capable of abutting an upper surface of the base member, a stopper member arcuately rising from the other end of the base member and having outer surface claws, and an engaging member of a substantially U-shaped sectional profile integral with the press-and-clamp member, defining a space for admitting the stopper member and having inner surface claws releasably engaging the outer surface claws of the stopper member when the stopper member is admitted in the space, whereby elongated bodies are clamped between the inner surface of the press-and-clamp member and the upper surface of the base member.

The base member is provided on the opposite sides thereof with leg members each having an inside claw engageable with a raised portion of a panel and on the opposite ends thereof with downward elastic members enabling firm engagement of the inward claws and rattle absorption.

BRIEF DESCRIPTION OF THE DRAWINGS

The above and other objects, features and advantages of the present invention will become more apparent to those skilled in the art from the description made hereinbelow with reference to the accompanying drawings, in which like reference characters designate like or corresponding parts throughout the several views, and wherein.

DETAILED DESCRIPTION OF THE PREFERRED EMBODIMENT

Figure 1:
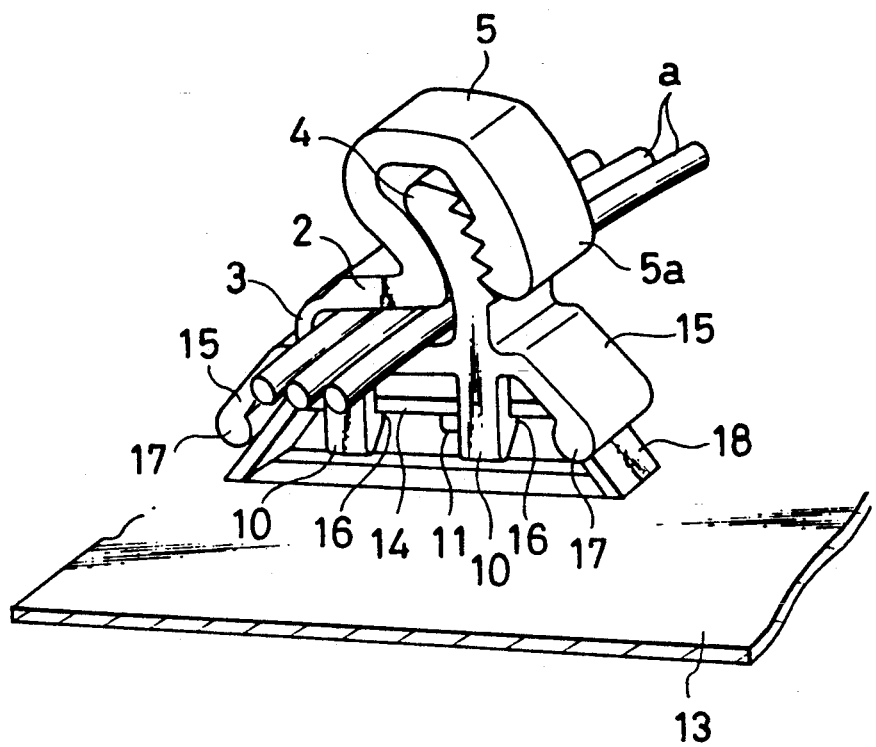
FIG. 1 is a perspective view illustrating one embodiment of a fastener for elongated bodies according to the present invention in a state of use.
Figure 2:
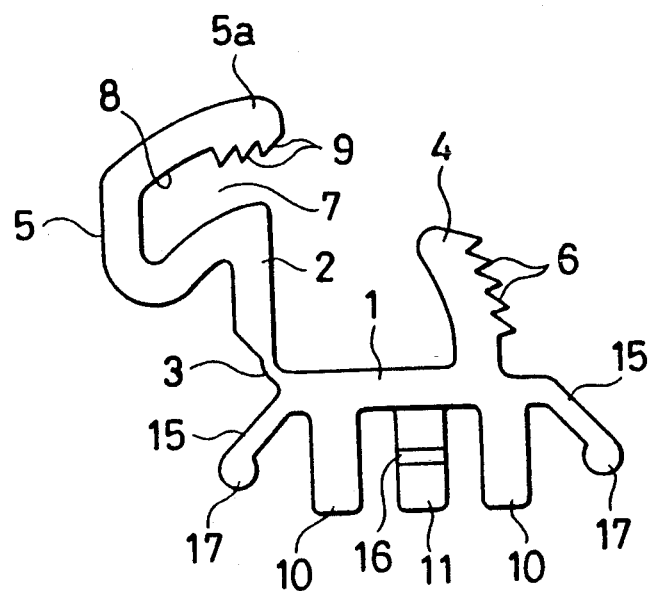
FIG. 2 is a front view showing the fastener of FIG. 1.
Figure 3:
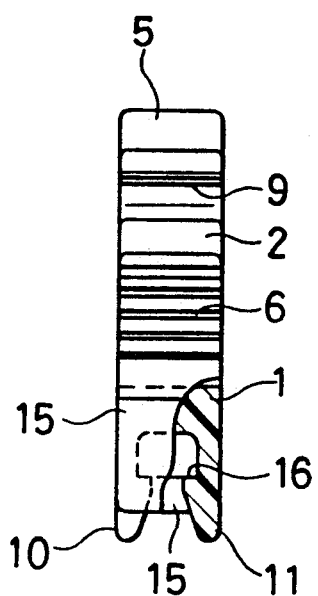
FIG. 3 is a partially cutaway right side view showing the fastener of FIG. 1.
Figure 4:
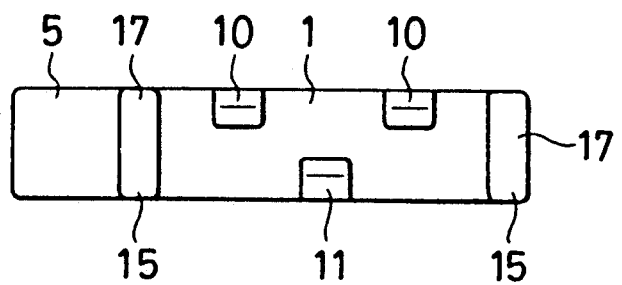
FIG. 4 is a bottom view showing the fastener of FIG. 1.

The present invention will now be described with reference to the illustrated embodiment.

FIG. 1 to FIG. 4 are a perspective view, a front view, a partially cutaway right side view and a bottom view, respectively, showing an embodiment of a fastener for elongated bodies according to the present invention. In this embodiment, the fastener is injection molded from a thermoplastic synthetic resin of appropriate elasticity and rigidity, such as nylon resin, and comprises a base member 1, a press-and-clamp member 2 swingably extending from one end of the base member 1 by means of a thin hinge 3, and a stopper member 4 arcuately rising from the other end of the base member 1.

The base member 1 and the press-and-clamp member 2 are thick and platelike and are connected to each other by means of the thin hinge 3. Therefore, the press and clamp member 2 can swing about the hinge 3 until its inner surface abuts the upper surface of the base member 1.

The press-and-clamp member 2 is integrally provided with an engaging member 5 that is engageable with the stopper member 4. The stopper member 4 is formed arcuately along the swing orbit of the press-and-clamp member 2 and is provided on its convex outer surface with saw-toothed claws 6. On the other hand, the engaging member 5 integral with the press-and-clamp member 2 has a substantially U-shaped sectional profile to define a space 7 for entirely admitting the stopper member 4 and has an outside piece 5a provided on its inner concave surface 8 with saw-toothed claws 9. When the stopper member 4 is partially or wholly admitted in the space 7 of the engaging member 5, the saw-toothed claws 6 and 9 engage with each other.

A metal panel 13 is press formed to have a cut-and-raised portion 14 of a trapezoidal sectional profile having a pair of rising slopes 18. The fastener of the present invention is attached to the raised portion 14.

The base member 1 has a pair of first legs 10 vertically extending downward from one side edge thereof and separated from each other, a second leg 11 vertically extending downward from the opposite side edge thereof at a position between the pair of first legs 10, and a pair of downwardly slanted elastic members 15 extending from the opposite ends thereof. The first and second legs 10 and 11 each have an inside claw 16 which engages with the edge of the raised portion 14 of the metal panel 13 to attach the fastener to the metal panel 13. The distance between the first and second legs 10 and 11 conforms to the width of the raised portion 14. The inside claws 16 project inward to an extent such that they can be stably supported on the opposite sides of the raised portion 14. The distance between the upper surface of the inside claws 16 and the lower surface of the base member 1 is much larger than the thickness of the raised portion 14 (that is, the thickness of the metal panel 13) so that the elastic members 15 enable easy attachment of the fastener to the metal panel 13 and firm and reliable engagement between the raised portion 14 and the legs 10 and 11, and that the elasticity of the elastic members 15 enables them to absorb fastener play relative to the raised portion 14. The elastic members 15 extend downwardly from the opposite ends of the base member 1 at predetermined angles, have bulged portions 17 at their respective free ends, and are adapted to attach the base member 1 to the raised portion 14 in cooperation with the legs 10 and 11.

The manner in which the fastener of the present invention having the foregoing construction is used will now be described.

The fastener is applied to the raised portion 14 of the panel 13 and, with the elastic members 15 abutted on the rising slopes 18 of the raised portion 14, is pushed against the raised portion 14. As a result, the inside claws 16 of the legs 10 and 11 engage the edges of the raised portion 14. In this state, since the elastic members 15 are slightly spread outwardly, their elastic restoring force acts on the rising slopes 18. This action causes the base member 1 to rise upward from the raised portion 14 and the inside claws 16 to engage the edges of the raised portion 14 more firmly, thereby preventing the base member 1 from rattling.

After the fastener has thus been attached to the panel 13, elongated bodies, such as electric cords a, are inserted between the stopper member 4 and the press-and-clamp member 2 and laid along the upper surface of the base member 1, and then the pressand-clamp member 2 is swung about the hinge 3 toward the stopper member 4 so as to admit the stopper member 4 in the space 7 defined by the engaging member 5 and engage the inner surface claws 9 of the engaging member 5 and the outer surface claws 6 of the stopper member 4, thus restraining and fastening the electric cords a between the inner surface of the press-and-clamp member 2 and the upper surface of the base member 1 by the engagement of the claws 6 and 9.

Figure 5:
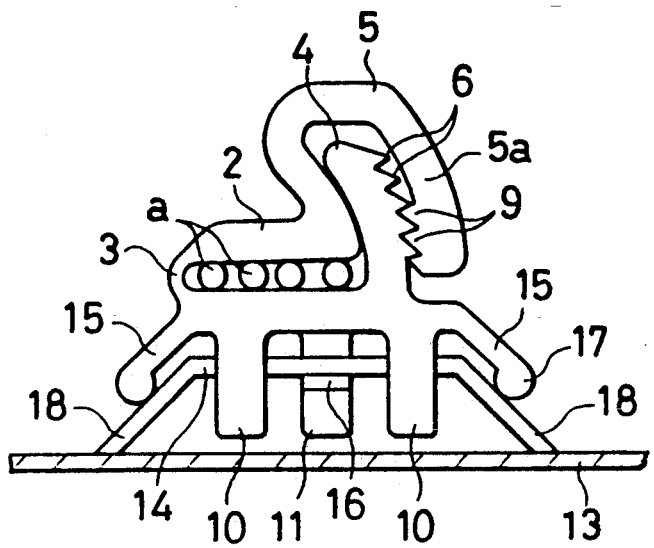
FIG. 5 is a front view showing the fastener of FIG. 1, with a small number of elongated bodies fastened.
Figure 6:
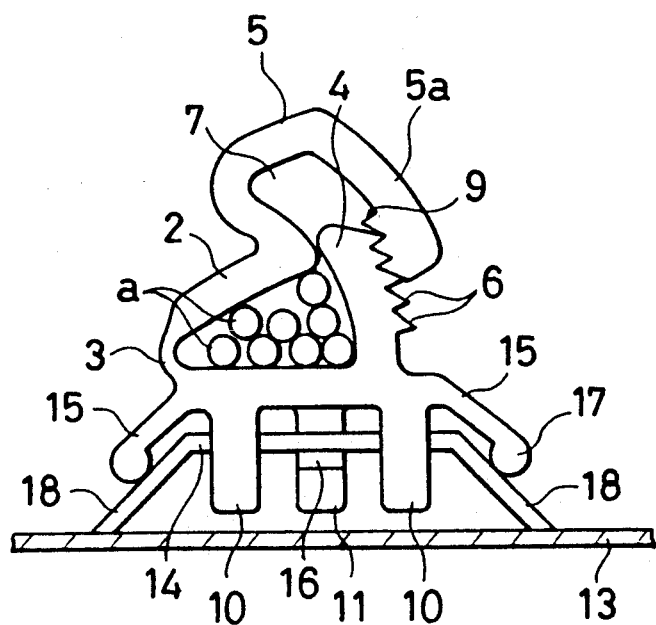
FIG. 6 is a front view showing the fastener of FIG. 1, with a large number of elongated bodies fastened.
Figure 7:
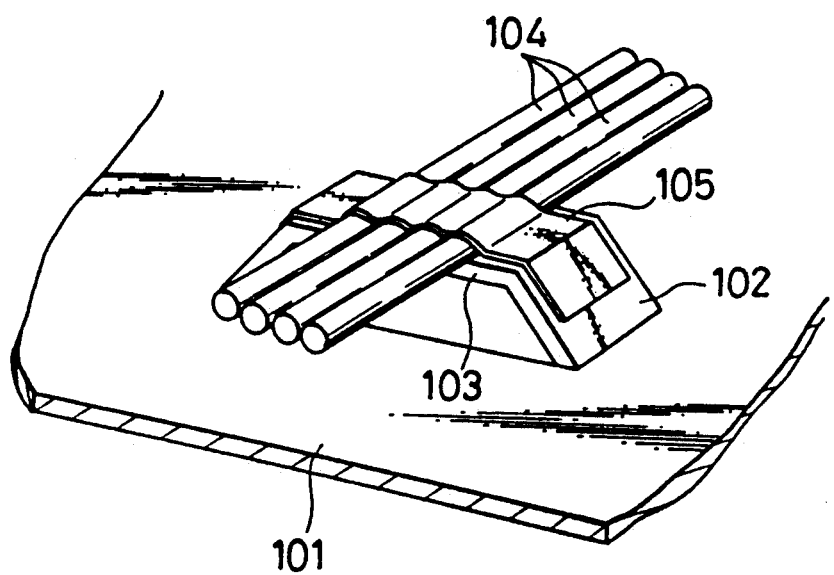
FIG. 7 is a perspective view illustrating a prior art fastener for elongated bodies.

The state of a small number of cords a fastened by the fastener of the present invention is shown in FIG. 5 and that of a large number of cords a fastened by the fastener of the present invention is shown in FIG. 6.

As shown in FIG. 5 and FIG. 6, from a small to a large number of the cords can be fastened by the fastener of the present invention by swinging the press-and-clamp member 2 about the thin hinge 3 and engaging the claws 6 and 9 with each other. A small number of cords a (including a single cord) can be fastened between the inner surface of the press and clamp member 2 and the upper surface of the base member 1. A large number of cords a can be fastened inside a triangular space defined by the inner surface of the press-and-clamp member 2, the inner surface of the stopper member 4 and the upper surface of the base member 1. When the press-and-clamp member 2 is pressed toward the upper surface of the base member 1 so as to clamp the cords a and is locked by the engagement between the claws 6 of the stopper member 4 and the claws 9 of the engaging member 5, it is pushed outward by the cords a but, owing to its elastic restoring force, the cords a are restrained and firmly fastened.

The engagement between the claws 6 and 9 is released by flexing the outside piece 5a of the engaging member 5 outwardly so as to unfasten the cords a. Since this releasing operation is carried out utilizing the spring force of the substantially U-shaped engaging member 5, if a projection to be grasped by the hand or a tool is formed on the free end of the outside piece 5a, the engagement can be released with ease against both the spring force of the engaging member 5 and the engagement force between the claws 6 and 9.

As has been described in the foregoing, according to the present invention it is possible to firmly fasten and restrain anything from a single elongated body to a bundle of elongated bodies with the press-and-clamp member. Further, since the elongated body or bodies can be unfastened by releasing the engaging member from the stopper member and restrained again with ease by pressing the press-and-clamp member against the base member, it is possible to easily inspect and replace the pipes or parts disposed in an automobile or electric appliance.

Furthermore, according to the present invention the fastener can be easily attached to a panel by merely pushing it against a raised portion of the panel, and the legs of the fastener can be firmly engaged with the raised portion by utilizing the function of the press-and-clamp member. Thus, the present invention is excellent in operability and provides firm and reliable fastening of elongated bodies. Moreover, the mode of fastening elongated bodies can be changed and adjusted in accordance with the number, diameter and thickness of the elongated bodies by changing the position of the engaging member and the position of engagement between the claws of the engaging member and those of the stopper member.

Obviously, many modifications and variations of the present invention are possible in light of the above teachings. It is therefore to be understood that within the scope of the appended claims, the present invention may be practiced otherwise than as specifically described herein.

What is claimed is:

1. A fastener for holding elongated bodies, comprising:
   a base member having an upper surface for supporting said elongated bodies;
   a clamping member having an inner surface for cooperating with said upper surface of said base member for retaining said elongated bodies therebetween;
   means for hingedly connecting said inner surface of said clamping member to one end of said upper surface of said base member such that said clamping member is capable of attaining any one of a plurality of positions, including a position at which said inner surface of said clamping member abuts said upper surface of said base member, relative to said base member such that said clamping member and said base member can cooperate with each other in retaining one more of said elongated bodies therebetween;
   a latching member projecting upwardly from a second end of said base member and having first latching means disposed thereon; and
   an engaging member integral with said clamping member, having a recess portion defining a space for accommodating said latching member, and having second latching means for releasably engaging said first latching means of said latching member when said latching member is disposed within said space of said engaging member so as to latchably dispose said clamping member at any one of said plurality of positions with respect to said base member whereby said elongated bodies are able to be clamped between said inner surface of said clamping member and said upper surface of said base member.

2. A fastener as set forth in claim 1, wherein:
   said engaging member projects upwardly from said clamping member so as to permit said inner surface of said clamping member to be disposed toward said upper surface of said base member while said recess portion of said engaging member accommodates said upwardly projecting latching member of said base member.

3. A fastener according to claim 1, wherein:
   said base member is provided with leg members which extend vertically downwardly from opposite sides of said base member and which have inwardly extending claws for engagement with a raised portion of a support panel to which said fastener is to be secured in order to mount said elongated bodies upon said support panel.

4. A fastener according to claim 3, wherein:
   said base member is further provided with elastic members extending downwardly from opposite ends of said base member for engagement with end portions of said support panel for biasing said fastener away from said support panel so as to effect firm engagement of said inwardly extending claws of said base member with said raised portion of said support panel and thereby eliminate any fastener play with respect to said raised portion of said support panel and absorb any fastener rattle with respect to said support panel.

5. A fastener as set forth in claim 1, wherein:
   said first latching means of said latching member comprise a plurality of claws formed upon an outer surface of said latching member; and
   said second latching means of said engaging member comprise a plurality of claws formed upon an inner surface of said engaging member.

6. A fastener as set forth in claim 1, wherein:
   said fastener is injection molded from a thermoplastic resin material.

7. A fastener as set forth in claim 1, wherein:
   said engaging member has a substantially U-shaped cross-sectional configuration for defining said space for accommodating said latching member.

8. A fastener as set forth in claim 1, wherein:
   said inner surface of said clamping member, said upper surface of said base member, said means hingedly interconnecting said inner and upper surfaces of said clamping and base members, and said latching member together define a pocket for housing said elongated bodies to be retained by said fastener.

9. A fastener according to claim 5, wherein:
   said inner surface claws of said engaging member and said outer surface claws of said latching member are saw-toothed in cross-section.

10. A fastener for holding elongated bodies, comprising:
    a base member having an upper surface for supporting said elongated bodies;
    a clamping member having an inner surface for cooperating with said upper surface of said base member for retaining said elongated bodies therebetween;
    hinge means disposed at a corner junction defined between said inner surface of said clamping member and said upper surface of said base member for hingedly interconnecting said inner surface of said clamping member to one end of said upper surface of said base member such that said clamping member is capable of attaining any one of a plurality of positions, including a position at which said inner surface of said clamping member abuts said upper surface of said base member, relative to said base member such that said clamping member and said base member can cooperate with each other in retaining one or more of said elongated bodies therebetween;
    a latching member projecting upwardly from a second end of said base member and having first latching means disposed thereon; and
    an engaging member integral with said clamping member, having a recess portion defining a space for accommodating said latching member, and having second latching means for releasably engaging said first latching means of said latching member when said latching member is disposed within said space of said engaging member so as to latchably dispose said clamping member at any one of said plurality of positions with respect to said base member whereby said elongated bodies are able to be clamped between said inner surface of said clamping member and said upper surface of said base member.

11. A fastener as set forth in claim 10, wherein:
said first latching means of said latching member comprise a plurality of claws disposed upon an outer surface portion of said latching member; and
said second latching means of said engaging member comprise a plurality of claws disposed upon an inner surface portion of said engaging member.

12. A fastener as set forth in claim 11, wherein:
said inner surface claws of said engaging member and said outer surface claws of said latching member are saw-toothed in cross-section.

13. A fastener as set forth in claim 10, wherein:
said base member is provided with leg members which extend vertically downwardly from opposite sides of said base member and which have inwardly extending claws for engagement with a raised portion of a support panel to which said fastener is to be secured in order to mount said elongated bodies upon said support panel.

14. A fastener as set forth in claim 13, wherein:
said base member is further provided with elastic members extending downwardly from opposite ends of said base member for engagement with end portions of said support panel for biasing said fastener away from said support panel so as to effect firm engagement of said inwardly extending claws of said base member with said raised portion of said support panel and thereby eliminate any fastener play with respect to said raised portion of said support panel and absorb any fastener rattle with respect to said support panel.

15. A fastener as set forth in claim 10, wherein:
said fastener is injection molded from a thermoplastic resin material.

16. A fastener as set forth in claim 10, wherein:
said engaging member has a substantially U-shaped cross-sectional configuration for defining said space for accommodating said latching member.

17. A fastener as set forth in claim 10, wherein:
said inner surface of said clamping member, said upper surface of said base member, said hinge means, and said latching member together define a pocket for housing said elongated bodies to be retained by said fastener.

18. A fastener as set forth in claim 10, wherein:
said engaging member projects upwardly from said clamping member so as to permit said inner surface of said clamping member to be disposed toward said upper surface of said base member while said recess portion of said engaging member accommodates said upwardly projecting latching member of said base member.

19. A fastener as set forth in claim 6, wherein:
said fastener comprising said base member, said clamping member, said means hingedly interconnecting said clamping and base members, said latching member, and said engaging member, is a one-piece molded component.

20. A fastener as set forth in claim 15, wherein:
said fastener comprising said base member, said clamping member, said hinge means, said latching member, and said engaging member, is a one-piece molded component.

* * * * *